(12) United States Patent
Kollross (10) Patent No.: US 7,399,219 B2
(45) Date of Patent: Jul. 15, 2008

(54) GATHERED TUBULAR FILM AND METHOD DEVICE FOR GATHERING

(75) Inventor: Gunter Kollross, Vienna (AT)

(73) Assignee: Ho-Me Connection K.F.T., Keczkemet (HU)

( * ) Notice: Subject to any disclaimer, the term of this patent is extended or adjusted under 35 U.S.C. 154(b) by 1000 days.

(21) Appl. No.: 10/398,244

(22) PCT Filed: Oct. 4, 2001

(86) PCT No.: PCT/EP01/11435

§ 371 (c)(1), (2), (4) Date: Nov. 13, 2003

(87) PCT Pub. No.: WO02/28192

PCT Pub. Date: Apr. 11, 2002

(65) Prior Publication Data

US 2004/0076723 A1   Apr. 22, 2004

(30) Foreign Application Priority Data

Oct. 5, 2000 (DE) ................................ 100 49 178

(51) Int. Cl.
*A22C 11/00* (2006.01)
(52) U.S. Cl. ......................................................... 452/32
(58) Field of Classification Search ................... 452/21, 452/22, 25, 30–35, 37, 46, 51
See application file for complete search history.

(56) References Cited

U.S. PATENT DOCUMENTS

| | | | | | |
|---|---|---|---|---|---|
| 3,860,728 A | * | 1/1975 | Tanner et al. | ............... | 426/105 |
| 3,965,537 A | * | 6/1976 | Ross et al. | ................... | 426/140 |
| 4,007,761 A | * | 2/1977 | Beckman | ..................... | 138/103 |
| 4,550,042 A | * | 10/1985 | Andrae et al. | .............. | 428/34.8 |
| 4,594,274 A | * | 6/1986 | De Jong et al. | ............. | 493/259 |
| 4,792,047 A | * | 12/1988 | Wood et al. | ................. | 493/206 |
| 5,088,956 A | * | 2/1992 | Kollross | ...................... | 452/32 |
| 5,215,495 A | * | 6/1993 | Crevasse | ..................... | 452/21 |
| 5,238,443 A | * | 8/1993 | Beardsley | .................... | 452/46 |

* cited by examiner

*Primary Examiner*—Thomas Price
(74) *Attorney, Agent, or Firm*—Stites & Harbison PLLC; Douglas E. Jackson (57) ABSTRACT

The invention relates to a gathered tubular film (12), especially consisting of artificial sausage skin, which is concertinaed to form a tubular caterpillar-type element. Until now, in order to gather as large a length as possible of the tubular film (12) to form a tubular caterpillar-type element of a certain length, methods have involved increasing the compression of the tubular caterpillar-type element. The aim of the invention is to achieve the same objective by providing a tubular caterpillar-type element having an outside diameter which is at least 10% larger than the outside diameter of the tubular film (12). In order to achieve this, the tubular film (12) is caught at certain points by suction nozzles on the gathering tool, and is pulled radially outwards.

6 Claims, 9 Drawing Sheets

GATHERED TUBULAR FILM AND METHOD DEVICE FOR GATHERING

The invention relates to a tubular film, in particular of artificial sausage skin, gathered into an accordion-folded tubular caterpillar-type element, and to a method for gathering tubular film and a device for performing this method.

The artificial skin needed for producing sausages is created in the form of tubular film. This film is gathered, in segments of 40 to 50 m in length each, for instance, on a gathering arbor into accordion-folded tubular caterpillar-type elements which are compressed to a length of approximately 50 to 60 cm, or in other words approximately 1/80 the length of the tubular piece. In sausage production, the tubular caterpillar-type elements are then placed individually and in succession on a filling tube, and then the tubular film is filled in segments with sausage mixture, depending on the length of the sausage, and cut off. At the beginning and end of each tubular caterpillar-type element, sausage mixture is lost and wasted. Moreover, removing the residue from the last tubular caterpillar-type element from the filling tube and placing the next tubular caterpillar-type element on it and sealing it off requires a relatively great amount of time. Until now, the proposals for improvement have focused on increasing the compression of the tubular caterpillar-type elements and simplifying and speeding up the process of changing them on the filling tube.

The object of the invention is, taking a fundamentally different path, to reduce these disadvantages substantially in their significance, and to attain this object, it is proposed that the shape of the tubular caterpillar-type elements be changed in such a way that its outside diameter is at least 10% and preferably at least 15% greater than the outside diameter of the tubular film.

At a minimum inside diameter that is predetermined by the diameter of the gathering arbor or the filling tube, increasing the outside diameter of the tubular caterpillar-type elements, for the same length, makes it possible to accommodate more tubular film material, or in other words a correspondingly greater length of tubular film in the thicker tubular caterpillar-type element. In the same proportion, the significance of the losses of sausage mixture when changing tubular caterpillar-type elements and of available productive time is also lessened.

Until now, when a tubular film with a diameter of 60 mm, for instance, was gathered on a gathering arbor with an outside diameter of 42 mm, what was obtained, depending on the gathering method and material, was a tubular caterpillar-type element with an outside diameter of about 55 to 65 mm. The reduction in the outside diameter upon gathering comes about because in all known gathering methods and gathering devices by means of gathering tools, for instance in the form of gear wheels, worms, or wobble rings, the inflated tubular film is deformed inward by radial pressure and compressed longitudinally of the gathering arbor by axial pressure. Thus the tubular film is compressed by the prevailing forces and thereby reduced longitudinally and transversely in its external dimensions. However, the friction of gathering wheel teeth that rotate radially outward and away against the folds that are formed causes a certain increase in the diameter of the tubular caterpillar-type element. Since furthermore the piece of tubular material to be gathered is inflated with a certain internal pressure and tumbles under the action of the gathering wheels engaging it, the outer folding edges are not located uniformly over the same radius. Their unequal length can also lead to a somewhat greater outside diameter of the tubular caterpillar-type element, compared to the diameter of the tubular film. However, the total difference is less than 10% of the tube diameter, especially if in a defined cross-sectional plane an adaptation is made to the mean radius on which the outer folding edges are located.

In the preferred practical embodiment, the radially outer folding edges of the tubular caterpillar-type element each extend over only a part of the outer circumference of the tubular caterpillar-type element, where they have a radius of curvature that is less than the radius of the tubular caterpillar-type element. This embodiment has the advantage that the incremental shift in individual circumferential regions of the tubular film radially outward makes a simpler realization possible than does a continuous, uniform radially outward unfolding operation.

In an advantageous refinement of the invention, this last-mentioned tubular caterpillar-type element, regardless of mechanical shear and frictional forces, has folds formed by tensile forces each oriented radially outward over part of the circumference and optionally additionally oriented axially to one side. These folds are an indication of an especially suitable production method.

To create a tubular caterpillar-type element of greater diameter and greater mass, according to the invention a gathering method is proposed, in which, as in the known gathering methods, the tubular film in the inflated state is contacted at some points by at least one gathering tool progressing axially and over the circumference, and is moved axially against a buffer, but the tubular film is grasped at certain points, where it comes into contact with the gathering tool, and, regardless of mechanical frictional forces, is pulled or pressed radially outward to beyond its radius measured from the center longitudinal axis of the gathering arbor.

Actively pulling or pressing of the tubular film radially outward causes a widening at some points in the fold formation during the axial compression, and overall this widening, progressing incrementally or continuously over the circumference and axially, leads to the thicker tubular caterpillar-type element sought. This positive outcome is attained even if the part of the gathering tool that grasps the tubular caterpillar-type element and pulls or presses it radially moves no faster axially than the adjoining region of the tubular film under the action of an axially pushing part of the gathering tool. However, if the part of the gathering tool that engages the tubular film at some points acts not only radially but axially to pull on each, this causes a locally slanted position of the cross section of the tubular film relative to the cross section of the gathering arbor, resulting in an even greater length between the radially outer folding edge and the region of the tubular film that is pulled toward the opposite side of the gathering arbor in the course of the radial and axial pulling or pressing. This positive effect can be explained by the fact that the length of an oval, created in an oblique cut through a cylinder, is greater than the diameter of the cylinder. The length of the oval resulting in the radial and additionally axial pulling of the tubular film is definitive for the diameter of the tubular caterpillar-type element.

In the preferred practical embodiment, the tubular film is engaged by the negative pressure of suction nozzles disposed on the gathering tools and is pulled radially outward in each case at some points. However, still other grasping means are conceivable, such as a temporary mechanical clamping or adhesion, and in the case of films with suitable electrical or magnetic properties, entrainment by generating suitable fields. Alternatively or in addition, the radial widening could also be accomplished by means disposed inside the tubular film, next to the gathering tube, which press the film outward mechanically, by means of jets of blown air, or fields, or in some other way. The force acting radially outward must be maintained, taking into account the axial compression occurring simultaneously, until such time as the radially pulled-out length of the outer folding edge is preserved as extensively as possible in each case. It has surprisingly been demonstrated that a tubular caterpillar-type element created in this way can be stripped more easily from the gathering arbor than a tubular caterpillar-type element gathered in the conventional way.

As already mentioned, it is advantageous if the tensile forces exerted at some points on the tubular film act not only radially but also have an axial component. To that end, it is provided in a preferred feature of the invention that the suction nozzles that engage the film at some points rotate about axes of rotation located transversely to the center longitudinal axis of the gathering arbor. In this rotary motion, the points of the tubular film that are grasped by the suction nozzles are entrained both axially and radially outward.

The radial force, in particular a tensile force, exerted according to the invention on the tubular film in the gathering, removes the outer folding edges from the longitudinal center axis of the gathering tube on one side. On the opposite side, the tubular film is at the same time pulled against the gathering tube. It was possible to ascertain that the friction between the gathering tube and the tubular film conversely pulled on one side has the favorable effect that it counteracts the frictional forces acting on the tubular film in the circumferential direction, which are exerted on the tubular film by the gathering tool rotating about the center longitudinal axis of the gathering tube, and which in the known gathering methods lead to twisting of the tubular film, if in the choice of diameter of the gathering tube, compared to the diameter of the tubular film, a certain amount is undershot. Until now, for this reason, a tubular film with a diameter of 50 mm was gathered on tubes that had a diameter of at least 36 mm. Tubular films with a diameter of 70 mm had to be gathered on gathering tubes with an outside diameter of at least 52 mm, because at smaller gathering tube diameters, the twisting of the tubular film in the axial working region of the gathering tool became so obvious that the folding became ragged.

In the method of the invention, in which the tubular film is pulled, in a constantly changing direction, radially outward and at the same time on the other side against the gathering tube, it is now possible to use smaller-diameter gathering tubes than before, without excessive twisting of the tubular film in the folding process. Two further advantages of the novel method are thus attained. The first is that for a certain caliber (diameter) of tubular film, in the mode of operation of the method of the invention, the outside diameter of the tubular caterpillar-type element becomes all the greater, the smaller the chosen diameter of the gathering tube is. Since at the same time the inside diameter, corresponding to the diameter of the gathering tube, of the tubular caterpillar-type element becomes less, its wall thickness increases to both sides. Thus in a preferred embodiment of the invention, tubular caterpillar-type elements with a wall thickness of at least 14 or even at least 18 mm can be produced, while the wall thickness of known tubular caterpillar-type elements amounts to only about 8 to 12 mm. The increase in the length of the tubular film that can be gathered up to form a tubular caterpillar-type element of a certain length is expressed in the proportion of the wall thicknesses.

The second advantage that can be attained by the now-possible reduction in the diameter of the gathering tube is that fewer gathering tools are needed for gathering various calibers and materials. With a single gathering tool, whose tooth shape is adapted to the diameter of the gathering tube, it is possible for instance to gather tubular films of 40 to 65 mm in diameter, or possibly of even greater caliber.

For performing the method of the invention, it is expedient to set a relatively low pressure for inflating the tubular film, so that it can be better grasped by the suction nozzles and on being gathered can be more easily deformed into an oval of elongated cross section, by radially outward-oriented tensile force, at the respective engagement point of the tensile force. Despite the lower internal pressure, a cleaner folding pattern is attained because of the radial tensile force. In addition, the internal pressure that is now possible has the advantage that the most recently formed folds of the tubular caterpillar-type element in each case maintain their shape more reliably.

A preferred device for performing the aforementioned gathering method has at least one gathering tool, progressing axially and over the circumference, can be brought into contact with defined circumferential regions of the inflated tubular film, and can be moved axially with the respective part contacting the tubular film. The special feature here is that the gathering tool, regardless of its friction with the tubular film, is provided with means for grasping the tubular film at some points and pulling it radially outward to beyond the radius of the tubular film measured from the center longitudinal axis of the gathering arbor. In an expedient feature of the invention, the gathering tool has two or more gathering wheels, which are distributed over the circumference and have teeth on which suction nozzles are disposed that upon the rotation of the gathering wheels come into contact with the tubular film and grasp it at some points temporarily. For this purpose, the teeth of the gathering wheels are preferably provided with suction nozzles, which communicate with a source of negative pressure via connection conduits and tubular wheel shafts with a sector-shaped opening during the rotation, in a certain angular region.

The invention is described in further detail below in terms of an exemplary embodiment shown in the drawing. Shown are.

Figure 1:
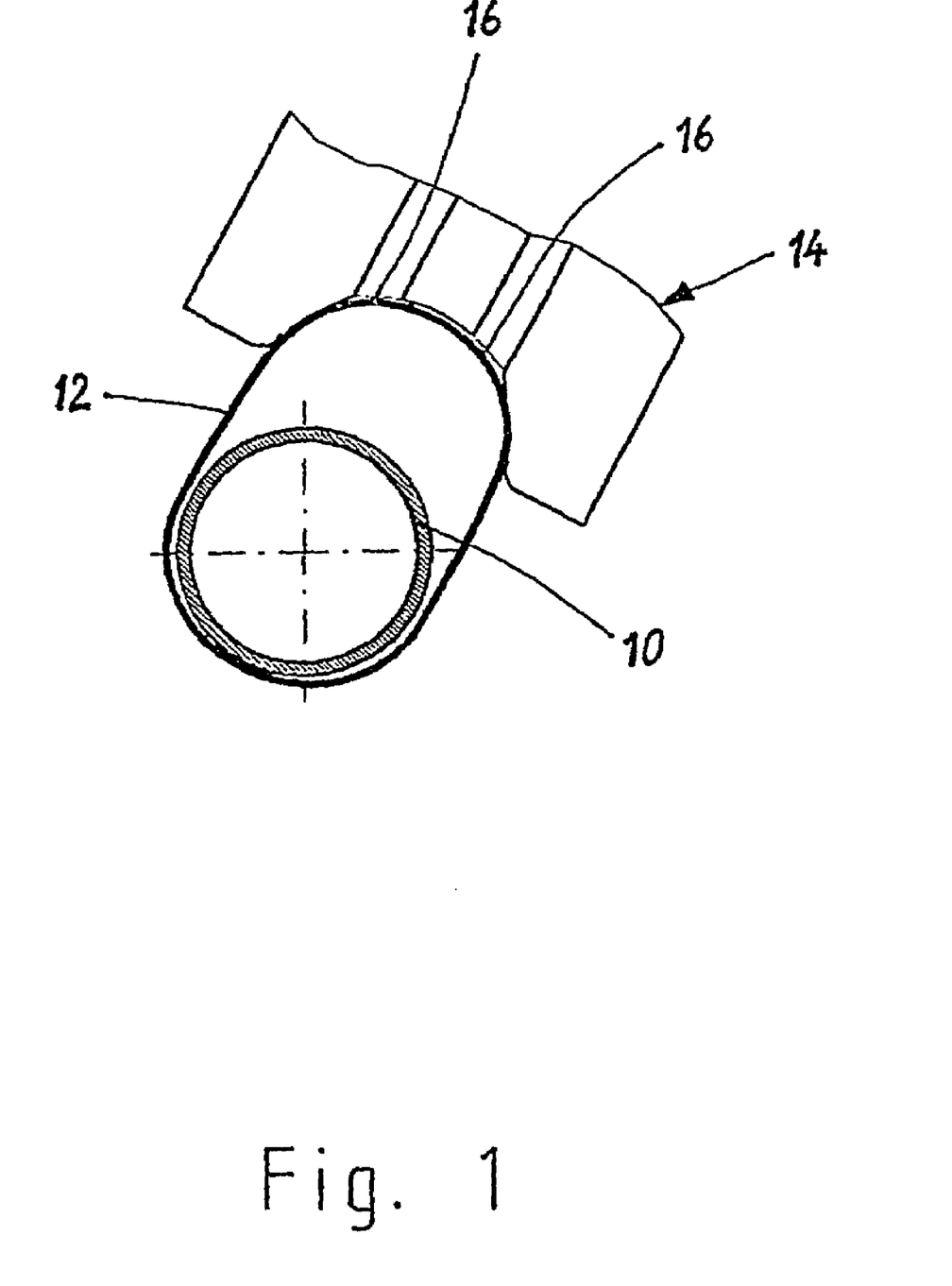
FIG. 1, a schematic illustration of the functional principle of the invention.

To illustrate the functional principle of the invention, FIG. 1 shows a cross section through a gathering arbor in the form of a gathering tube 10, which has been driven into a tubular film 12 that has been inflated by blown-in air. Normally, the gathering tube 10 and the tubular film 12 have a substantially concentric length, while a gathering tool with gathering wheels 14, of which only one tooth is shown in FIG. 1, engage the inflated tubular film 12 and place it in folds and axially compress it toward one end of the gathering arbor 10 against a buffer.

The special feature of the gathering device described here as an exemplary embodiment is that suction nozzles 16 are disposed on the teeth of the gathering wheels 14 and engage the tubular film 12 at the point where they come into contact with it and carry the grasped point axially along with them and pull it radially outward during the rotation of the gathering wheel 14. In the process, at this point the tubular film 12 is deformed in cross section into an oval, which on one end rests on the gathering tube 10 and on the other has a very much greater spacing from the gathering tube 10 than a tubular film that concentrically surrounds the gathering tube.

Figure 2:
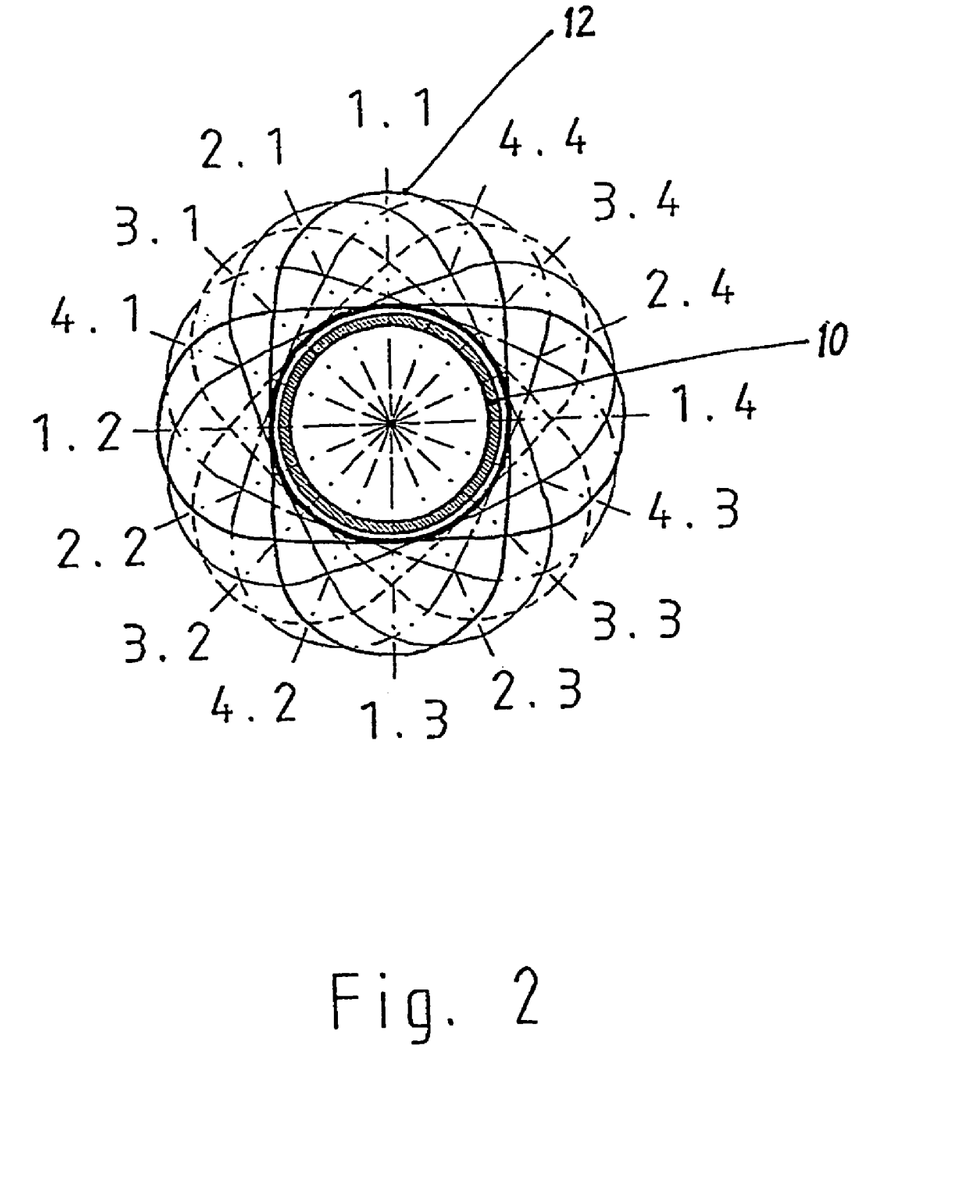
FIG. 2, also a schematic illustration of a sequence of individual work steps for producing a plurality of folding edges in the tubular film that are distributed over the circumference and the axial length.
Figure 4:
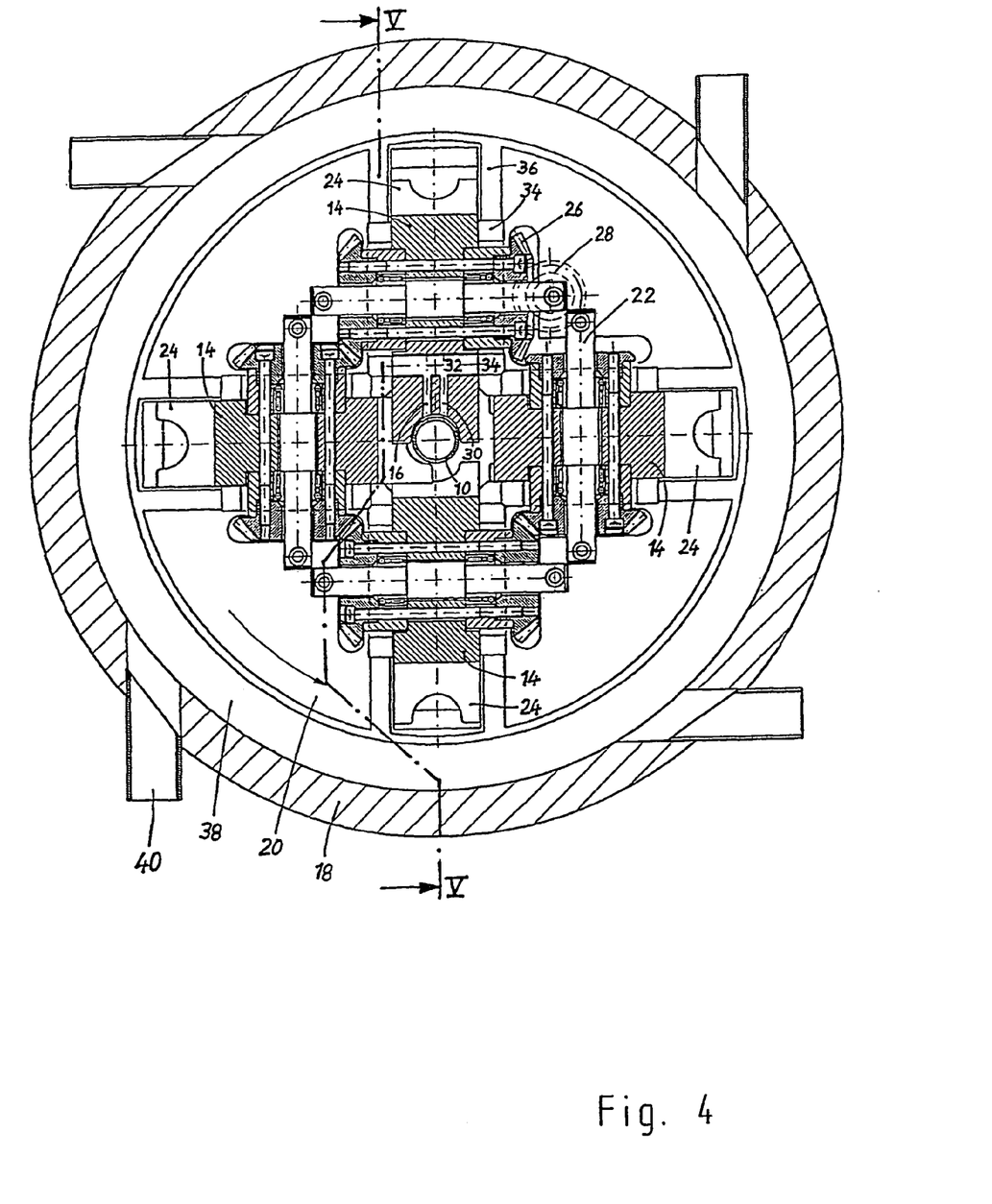
FIG. 4, a cross section taken along the line IV-IV in FIG. 5 through a gathering tool, whose gathering wheels are provided with suction nozzles for grasping the tubular film at some points and pulling it along with them.
Figure 5:
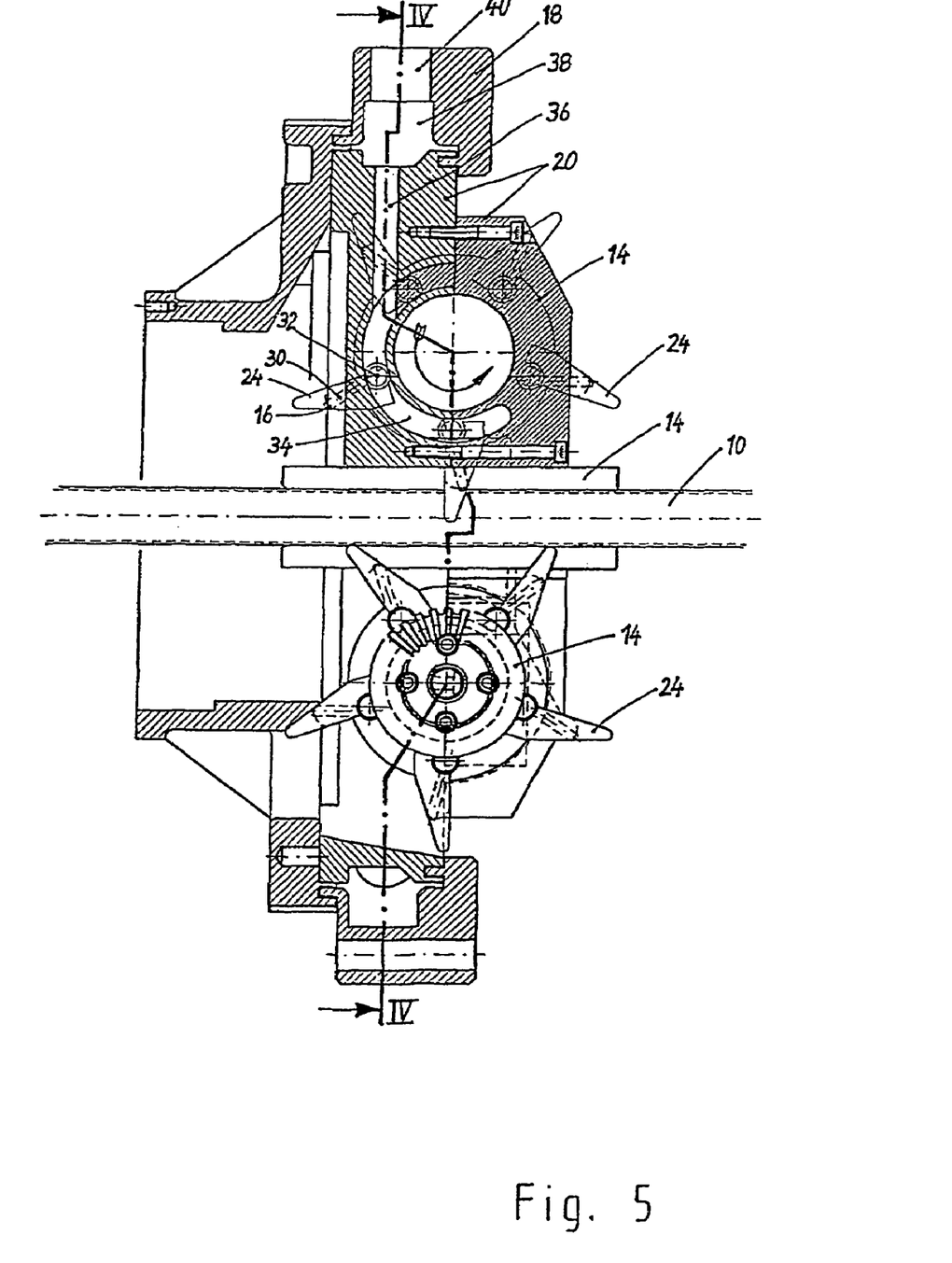
FIG. 5, a simplified axial longitudinal section taken along the line V-V in FIG. 4 through the gathering device of FIG. 4.
Figure 6:
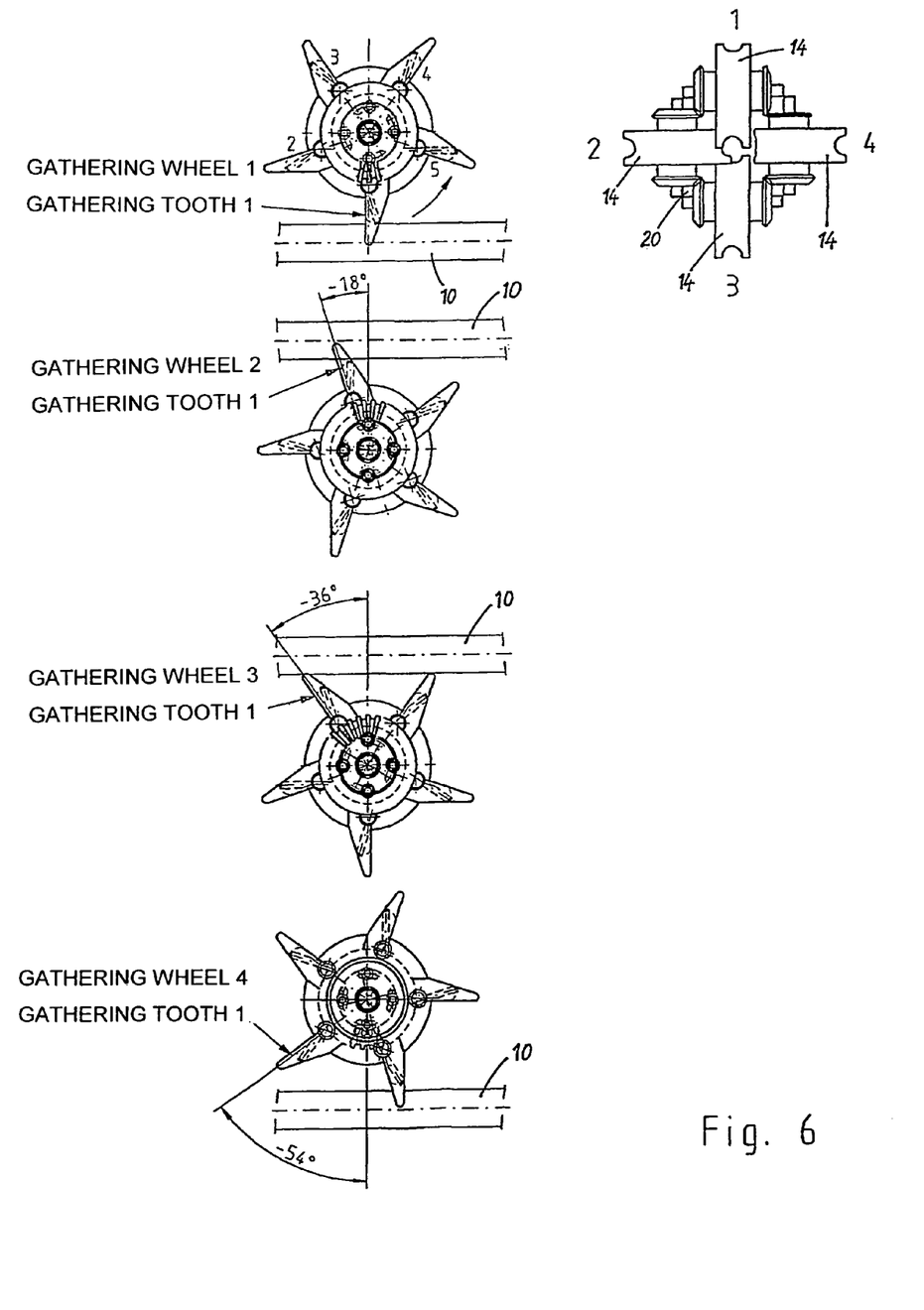
FIG. 6, a graphical illustration of the chronologically staggered action of the four gathering wheels, visible in FIG. 4, on a tubular film to be gathered.

If now, in the known manner, as shown in FIGS. 4-6 four gathering wheels, distributed at equal intervals over the circumference, and each in this example having five teeth on each of which suction nozzles are disposed, act on the tubular film and in the process a rotary motion of the entire gathering tool also occurs, then in principle what results is the fold pattern, created by the teeth of the four gathering wheels, shown in FIG. 2, in which for the sake of simplicity only four teeth per gathering wheel are shown. It can be seen that each tooth, by means of its suction nozzles 16, deforms the tubular film 12 at the engagement point into an oval as shown in FIG. 1. In the oval deformation regions or folds provided with numbers in FIG. 2, the first digit in each case designates the gathering wheel, and the second digit designates the tooth. Thus "1.1" means that the oval convolution identified by this number has been created by tooth 1 of the first gear wheel. "4.3" correspondingly designates the oval convolution created by tooth 3 of the fourth gear wheel. As can be seen from FIG. 2, each tooth of one gathering wheel is followed, at a point offset on the circumference, by a tooth of the gathering wheel next to it in a circumferential direction. The oval convolutions pulled radially outward by the suction nozzles 16, which convolutions each extend over only a certain defined outer circumferential region, are overall distributed uniformly over the circumference and also extend over one another and form a tubular caterpillar-type element, whose diameter is determined by the length of the radially pulled-out ovals and is greater in every case, because of the radial deflection, by at least 10% than the diameter of the inflated tubular film. It can also be seen from FIG. 2 that for the same caliber, the outside diameter of the tubular caterpillar-type element becomes greater, the less the diameter of the gathering tube 10 is.

Figure 3:
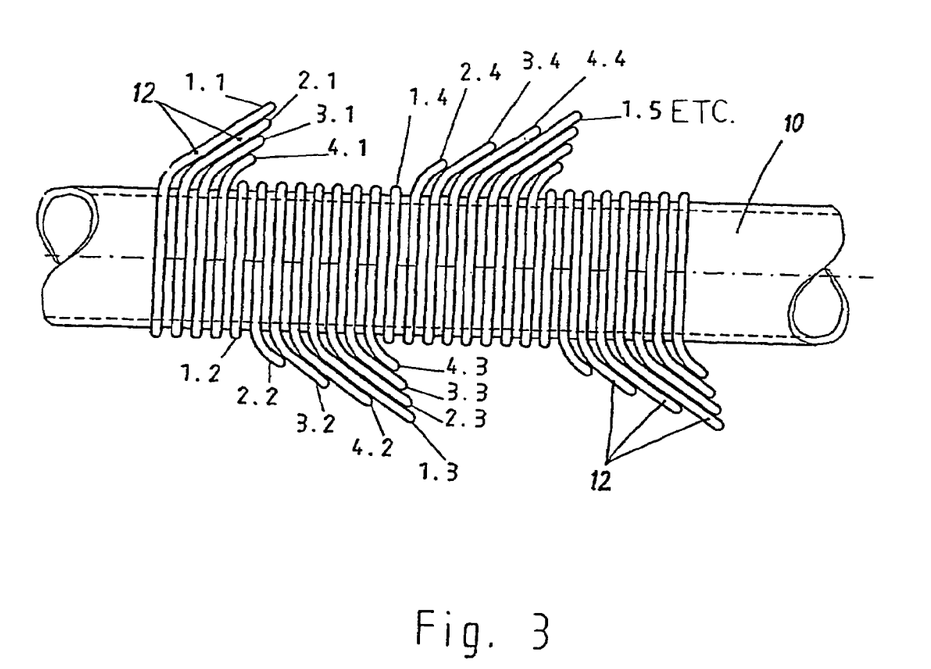
FIG. 3, a schematic longitudinal section through a tubular caterpillar-type element produced by the method illustrated in FIGS. 1 and 2.

FIG. 3 shows the convolutions in axial section that have been created by the individual teeth of the gathering wheels. It can be seen from this that the convolutions created in succession by the teeth of the gathering wheels are not only offset uniformly over the circumference but also axially.

The gathering tool shown in cross section in FIG. 4 is known in its basic configuration. It is rotatably supported in an outer, fixed housing 18 and is driven, during the gathering operation, by a known rotary drive, not shown, to rotate counterclockwise, in this example, as indicated by the arrow. The essential components of the gathering tool are a gathering wheel holder 20, in which four shafts 22 are supported in a square arrangement, on each of which in turn a respective gathering wheel 14 is rotatably supported, each gathering wheel for instance having five teeth 24 distributed over the circumference. Except for the gathering wheel 14 shown on the right in FIG. 4, the gathering wheels on both sides are each connected in a manner fixed against relative rotation to a respective cone wheel 26. The gathering wheel 14 on the right is connected on only one side to a cone wheel in a manner fixed against relative rotation. The gathering wheel 14 shown at the top in FIG. 4 is driven to rotate by a drive mechanism 28 shown in suggested form and by the adjacent cone wheel 26. The drive of the other gathering wheels is derived from the rotary motion of the gathering wheel 14 shown at the top in FIG. 4, via the cone wheels 26 meshing with one another. In this example, the gathering wheels 14 rotate about their axes at approximately the same rpm as that of the overall gathering head about the gathering tube 10.

The gathering tube 10 is located in the center of the gathering tool. The teeth 24 of the gathering wheels 14, in their rotation, extend nearly to the gathering tube 10.

The gathering tool of FIG. 4 is known, up to the point described above. Its special feature is that at all the teeth 24 of the gathering wheels, in a region that comes into contact with the tubular film 12, suction nozzles 16 are disposed, preferably in the axially middle region of the tooth or near the radially outermost point on the leading side. These suction nozzles are each in communication with a source of negative pressure, via a respective conduit 30 extending essentially radially in the tooth 24, and then a conduit 32 extending axially through the gathering wheel 14, a respective conduit 34 (see also FIG. 5) of circular arc shape, disposed on each side of each gathering wheel 14 and extending over a defined circumferential region, in a part belonging to the gathering wheel holder 20, and conduits 36 extending onward radially outward in a straight line in the aforementioned part, an annular conduit 38, which is defined by the gathering wheel holder 20 and the housing 18, and a plurality of lines 40 distributed over the circumference and connected to the annular conduit 38.

As FIG. 5 shows, the circular-arc-shaped conduits 34 are disposed such that on the one hand the conduits 32 and the suction nozzles 16 are connected to the source of negative pressure for only the shortest possible time during the revolution of one gathering tooth 24, so as to minimize the energy loss from unnecessary aspiration of air. On the other hand, however, the conduit 32 should already attain connection to the circular-arc-shaped conduit 34 a certain length of time before the associated gathering tooth 14 arrives at the tubular film 12, so that at the instant of arrival the desired suction force is available at the suction nozzle 16, so that the tubular film is reliably grasped at the suction nozzles 16 and entrained in the further rotation of the gathering wheel 14. In this connection, it should be considered that upon connection of the conduit 32 with the circular-arc-shaped conduit 34, the air volume present in the conduit system must first be speeded up.

After the passage through the position of greatest approach of a gathering tooth 24 to the gathering tube 10, the conduit 32 must still remain in communication with the circular-arc-shaped conduit 34 over a curved course that is long enough that the suction nozzles 16 can pull the point of the tubular film 12 grasped by them, as shown in FIGS. 1 and 2, radially outward as far as possible. In this rotary angle position of the gathering tooth 24, the connection of the conduit 32 with the conduit 34 ends.

It has proved expedient to begin the connection of the suction nozzles with the source of negative pressure at approximately 70° to 90° before the point of greatest approach to the gathering tube, and to maintain this connection until about 50° to 60° after that point.

FIG. 6 shows that for four gathering wheels 14, numbered 1-4 in FIG. 6, distributed over the circumference of the gathering arbor 10, and a respective five teeth 24, distributed uniformly over the circumference of each of the gathering wheels, the relative rotary angle position of the gathering wheels must be set such that after 18° of rotation of all the gathering wheels, beginning at the position of the greatest approach of a tooth 24 of a certain gathering wheel 14 to the gathering tube 10, a tooth of the adjacent gathering wheel 14 that is leading in terms of the direction of rotation of the gathering tool reaches the position of greatest approach to the gathering arbor. The outset position of the gathering wheels and gathering teeth, shown in FIG. 2, is then reached after 5×18°=90°.

Figure 7:
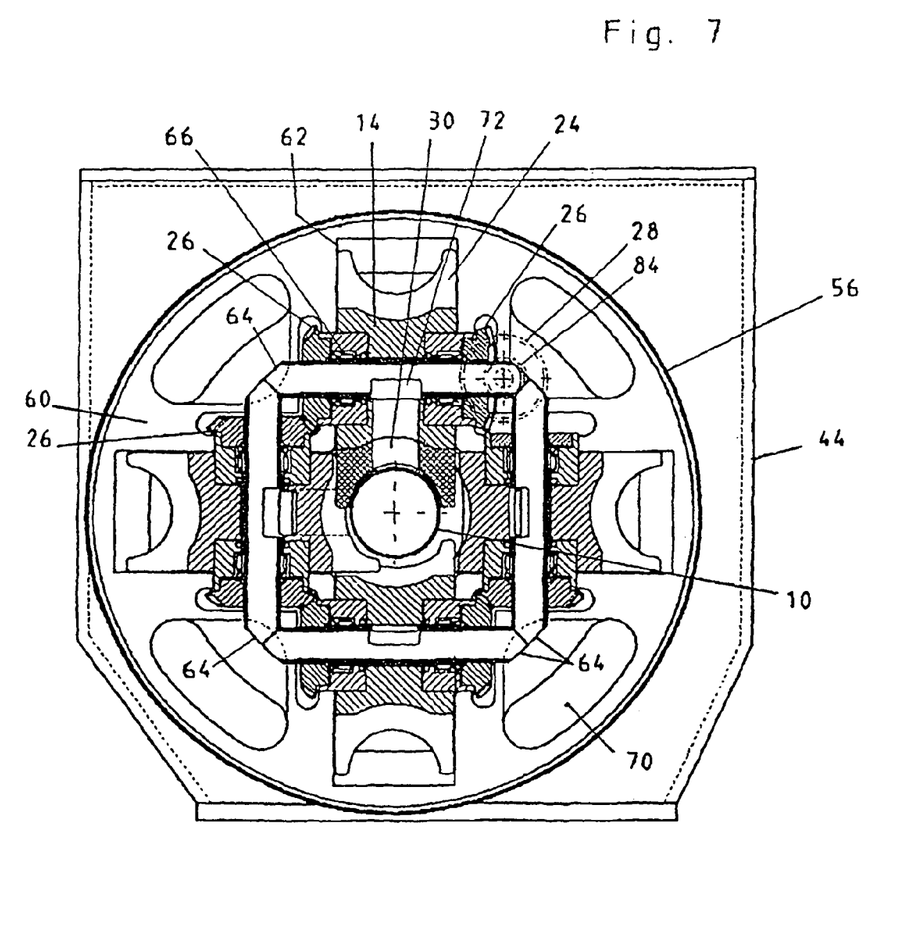
FIG. 7, a front view, partly in section, of a gathering wheel holder, in which the gathering wheels are connected to a source of negative pressure via tubular shafts.
Figure 8:
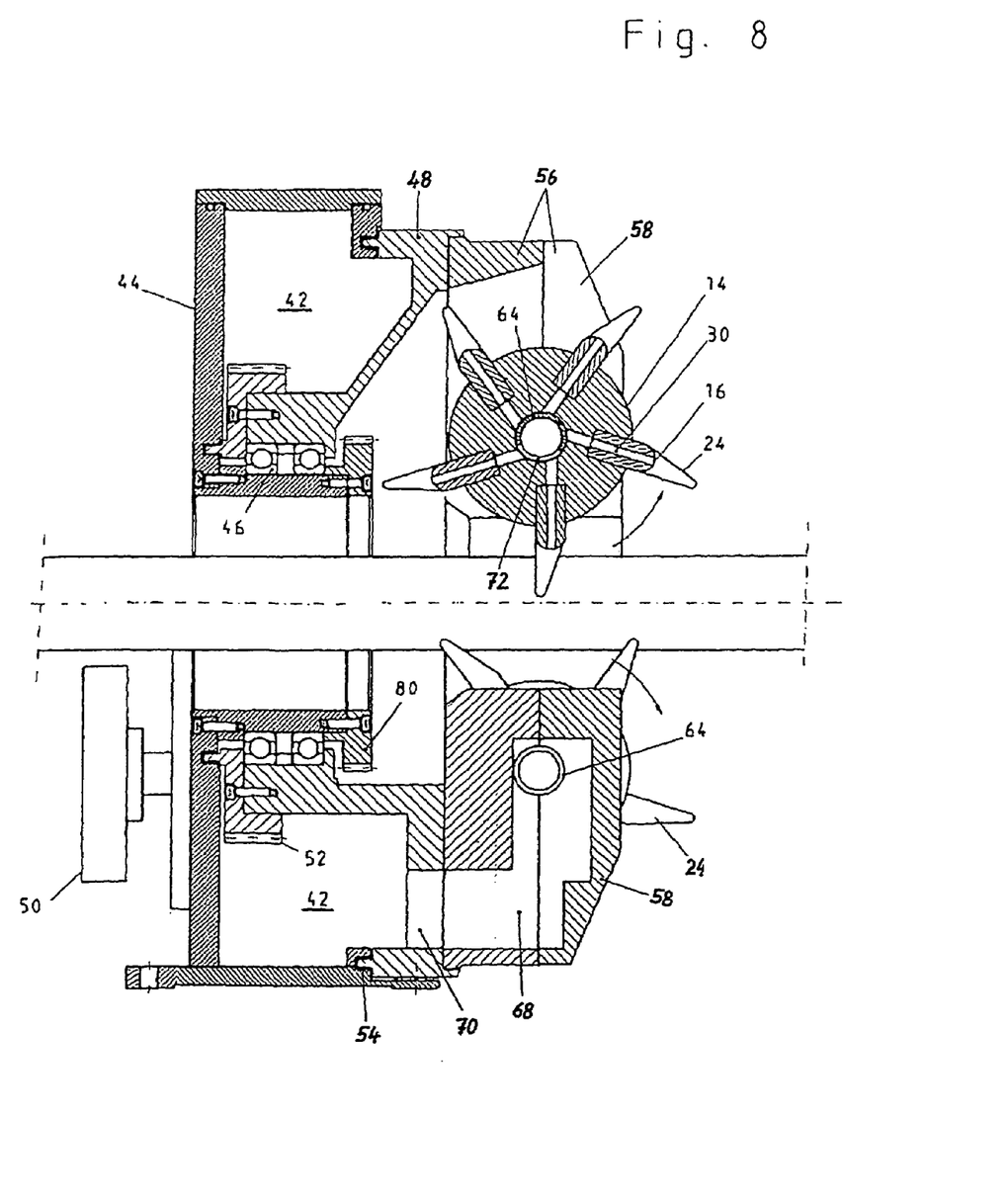
FIG. 8, a longitudinal section through the gathering wheel holder of FIG. 7 and through the fixed gathering head holder that supports it.
Figure 9:
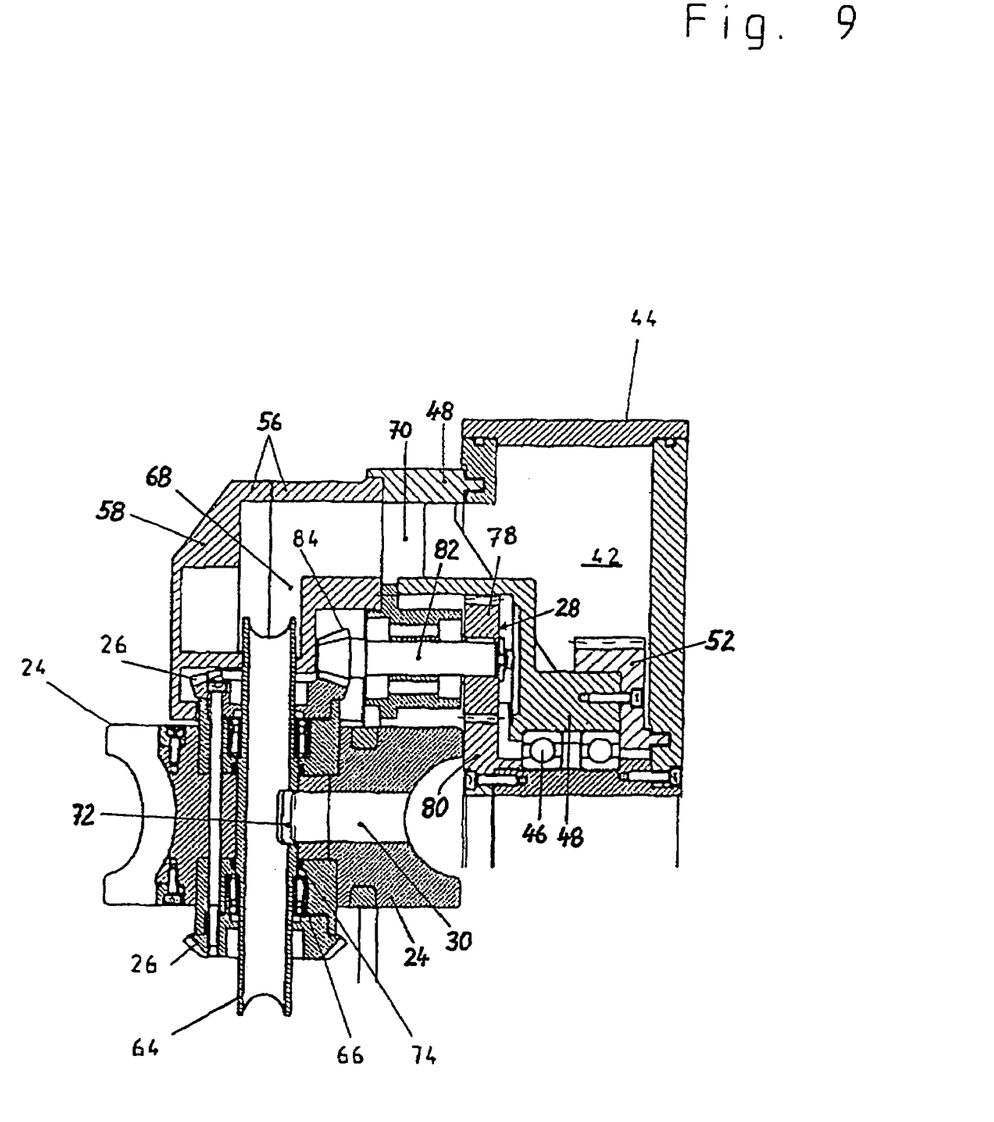
FIG. 9, a cross section through the axis of rotation of the gathering wheel shown in FIG. 8, along with its support and its gear wheel drive.

The exemplary embodiment shown in FIGS. 7-9 is essentially equivalent to the version of FIGS. 4 and 5. The corresponding individual parts are therefore identified by the same reference numerals. However, in comparison to the version of FIGS. 4 and 5, at least with comparatively larger gathering wheels, it is an advantage that the negative pressure is brought to the suction nozzles 16 better.

The source of negative pressure, not shown, is connected, via a line connection also not shown, to a sealed-off internal hollow chamber 42 in the fixed housing 44 of the so-called gathering head holder. A so-called head wheel 48 is rotatably supported on this housing 44 by means of ball bearings 46 and is driven to rotate, relative to the fixed gathering head holder 44, by a drive mechanism 50, suggested in FIG. 8, which engages a set of teeth 52 mounted on the head wheel 48. A labyrinth seal 54 or other seal is mounted on the outer circumference, between the gathering head holder 44 and the head wheel 48, to minimize negative pressure losses from the chamber 42.

The head wheel 48 that can be driven to rotate is solidly connected to a gathering wheel holder 56. Its shape is essentially that of an annular disk, which in combination with four sector-shaped caps 58 to be firmly screwed to it forms the support of the gathering wheels 14. The bearing face of one of the four sector-shaped caps 58 is identified in FIG. 7 by reference numeral 60. It is defined by the outer circumferential edge and two side edges 62, which form a right angle with one another. Each cap 58 covers two adjoining ends each of the bearing shafts 64, which are seated nonrotatably in the gathering wheel holder 56, and on each of which one of the four gathering wheels 14 is rotatably supported by means of roller bearings 66.

The tubular bearing shafts 64 end in closed-off internal hollow chambers 68, which communicate, via openings 70 in the head wheel 48, with the inner hollow chamber 42, which is under negative pressure, in the gathering head holder 44. Thus even the internal hollow chambers of the tubular bearing shafts 64 are constantly under negative pressure during operation. As can be seen from FIGS. 8 and 9, the negative pressure from there reaches the suction nozzles 16 via an opening 72 in the circumferential wall of the tubular bearing shafts 64 and via the essentially radial connection conduits 30 that end radially inward at the bearing shaft. Just as the circular-arc-shaped conduits 34 in the version of FIGS. 4 and 5 extend over only that angular region in which the suction nozzles 16 are meant to be subjected to negative pressure during the rotation of the gathering wheel 14, the opening 72 in the wall of the tubular bearing shafts 64 also reaches over only a corresponding angular region. In the remaining circumferential region, the connection conduits 30 and the suction nozzles 16 are disconnected from the source of negative pressure. The angular region defined by the size of the opening 72 is the region which is provided, in accordance with the above description in conjunction with FIG. 5, so that the tubular film will be grasped by a suction nozzle 16 and then entrained both axially and radially outward.

To assure that no vacuum will be lost between the bearing shaft 64 and the gathering wheel 14, seals 74 are mounted beside the roller bearings 66. Seals are also present between the bearing shafts 64 and the gathering wheel holder 56 and the respective cap 58.

It can also be seen from FIG. 9 that the drive mechanism 28 of the gathering wheels 14 comprises a gear wheel 78, which meshes with its teeth with a ring gear 80 on the fixed gathering head holder 44 and is connected, via a shaft 82 supported rotatably on the gathering wheel holder 56, in a manner fixed against relative rotation to a cone wheel 84, which meshes with a cone wheel 26 that is connected in a manner fixed against relative rotation to a gathering wheel 14. Thus the rotary drive, embodied as in the version of FIGS. 4 and 5, of the gathering wheels 14 is derived from the rotary drive of the gathering wheel holder 56.

A comparison of FIG. 8 with FIG. 5 shows that the suction nozzles 16 need not necessarily be located on the leading side of the gathering teeth 24. In FIG. 8, the suction nozzles 16 are located approximately in the middle, relative to the thickness of one tooth 24. The tooth itself, because of the suction opening 16, has a greater thickness in the region of that opening than the teeth of conventional gathering wheels, its thickness for instance being from 20 to 24 mm instead of only 5 to 10 mm. It has been found that the greater tooth thickness has an advantageous effect on the outcome of gathering, since the resultant greater friction promotes the axial and radial entrainment of the tubular film. It has furthermore been found that because of the entrainment of the tubular film by the suction nozzles 16 and by the greater friction by the thicker gathering teeth 24, the teeth need not be polished to such a high quality. Since the relative sliding of the gathering teeth along the tubular film is reduced, a simpler, less-expensive machining of the gathering wheels suffices without the risk of injury to vulnerable artificial skins.

It is understood that with different gathering tools, there are different engagement ratios. The novel method can also be performed with gathering devices that do not rotate about the gathering arbor or a central axis corresponding to the center longitudinal axis of the gathering arbor.

The invention claimed is:

1. A gathered tubular caterpillar-type element of artificial sausage skin, comprising:
   a tubular film having a base outside diameter;
   the tubular film being longitudinally gathered about a longitudinal axis into a caterpillar-type configuration;
   wherein the caterpillar-type configuration has a multitude of ring sections each of which have been radially pulled out by a unilateral radial tensile force into an oval shape and longitudinally compressed, each said ring section including
   (a) a folded-over outside edge which extends only over a part of a circumference of the gathered tubular film and which is a distal end portion of the longitudinally compressed oval shaped ring section which is distal from the longitudinal axis, and
   (b) an oblong through-hole;
   wherein the caterpillar-type configuration has
   (a) a sequence of the folded-over outside edges which have, relative to one another, staggered orientations distributed about the circumference of the caterpillar-type configuration, and
   (b) a central round through-hole which is composed of overlapping portions of the oblong through-holes of the longitudinally compressed oval shaped ring sections, where the longitudinal axis is a central axis of the round through hole; and wherein the caterpillar-type configuration has an outside diameter which is at least 10% greater than the base outside diameter of the tubular film.

2. The gathered tubular caterpillar-type element of claim 1, wherein the outside diameter of the caterpillar-type configuration is at least 15% greater than the base outside diameter of the tubular film.

3. The gathered tubular caterpillar-type element of claim 1, wherein a wall thickness of the caterpillar-type configuration is at least 14 mm.

4. The gathered tubular caterpillar-type element of claim 1, wherein the folded-over edge portions have a radius of curvature that is at least 10% less than a radius of the caterpillar-type configuration.

5. The gathered tubular caterpillar-type element of claim 4, wherein the folded-over edge portions have a radius of curvature that is at least 15% less than the base radius of the tubular caterpillar-type element.

6. The gathered tubular caterpillar-type element of claim 1, wherein each said ring section is discrete.

* * * * *